United States Patent
Preisler et al.

(10) Patent No.: US 6,364,346 B1
(45) Date of Patent: Apr. 2, 2002

(54) MOTOR VEHICLE TRIM ASSEMBLY INCLUDING A HOLLOW PLASTIC PANEL FOR A SIDE IMPACT INFLATABLE AIR BAG SYSTEM

(75) Inventors: Darius J. Preisler, Macomb; Jason T. Murar, Clinton Township; Bradley Kusky, Swartz Creek, all of MI (US)

(73) Assignee: Patent Holding Company, Fraser, MI (US)

(*) Notice: Subject to any disclaimer, the term of this patent is extended or adjusted under 35 U.S.C. 154(b) by 0 days.

(21) Appl. No.: 09/248,128

(22) Filed: Feb. 10, 1999

(51) Int. Cl.[7] ............................................... B60R 21/22
(52) U.S. Cl. ................................. 280/730.2; 280/728.2
(58) Field of Search .......................... 280/728.1, 728.2, 280/728.3, 730.1, 730.2, 732

(56) References Cited

U.S. PATENT DOCUMENTS

| | | |
|---|---|---|
| 4,474,717 A | 10/1984 | Hendry |
| 5,069,858 A | 12/1991 | Hendry |
| 5,098,637 A | 3/1992 | Hendry |
| 5,225,141 A | 7/1993 | Hendry |
| 5,273,309 A | 12/1993 | Lau et al. |
| 5,301,966 A | 4/1994 | Sakata |
| 5,308,112 A | 5/1994 | Hill et al. |
| 5,322,322 A | 6/1994 | Bark et al. |
| 5,332,257 A * | 7/1994 | Rogers et al. ............... 280/732 |
| 5,333,898 A | 8/1994 | Stutz |
| 5,333,899 A | 8/1994 | Witte |
| 5,362,097 A | 11/1994 | Barske |
| 5,398,958 A | 3/1995 | Taggart |
| 5,445,410 A * | 8/1995 | Czapp et al. ............... 280/732 |
| 5,447,328 A | 9/1995 | Iannazzi et al. |
| 5,447,762 A | 9/1995 | Loren |
| 5,458,361 A | 10/1995 | Gajewski |
| 5,462,308 A | 10/1995 | Seki et al. |
| 5,464,246 A | 11/1995 | Castro et al. |
| 5,468,039 A | 11/1995 | Matsumoto et al. |
| 5,480,181 A | 1/1996 | Bark et al. |
| 5,540,459 A | 7/1996 | Daniel |
| 5,549,324 A | 8/1996 | Labrie et al. |
| 5,556,153 A | 9/1996 | Kelman et al. |
| 5,564,515 A | 10/1996 | Schambre |
| 5,566,977 A | 10/1996 | Wipasuramonton |
| 5,588,672 A | 12/1996 | Karlow et al. |
| 5,605,346 A | 2/1997 | Cheung et al. |
| 5,636,862 A | 6/1997 | Cheung et al. |

(List continued on next page.)

FOREIGN PATENT DOCUMENTS

| | | |
|---|---|---|
| DE | 43 06 465 C2 | 9/1993 |
| DE | 196 07 342 A1 | 8/1997 |
| DE | 199 60 006 A1 | 6/2000 |

Primary Examiner—J. J. Swann
Assistant Examiner—Christopher Bottorff
(74) Attorney, Agent, or Firm—Brooks & Kushman P.C.

(57) ABSTRACT

A motor vehicle trim assembly includes a plastic outer trim panel having an opening, a door for closing the opening, an inner trim panel for storing an uninflated air bag curtain, a hinge for the door and a latch for holding the door in its closed position yet still allow deployment of the air bag curtain through the opening in the outer trim panel. Both the door and the hinge comprise a single injection molded part. The assembly preferably includes a lock for locking the door in its closed position yet also allow deployment of the air bag curtain. The inner trim panel, the latch and the lock all comprise a single injection molded part. The inner trim panel has a conduit portion integrally formed with a solid base wall portion which receives and retains the uninflated air bag curtain as well as an inflator of the system. A gas channel defined by the conduit portion may conduct fluids or pass solid objects such as electric wires through the inner trim panel.

22 Claims, 4 Drawing Sheets

U.S. PATENT DOCUMENTS

| | | |
|---|---|---|
| 5,639,116 A | 6/1997 | Shimizu et al. |
| 5,641,178 A * | 6/1997 | Lee ............................ 280/732 |
| 5,647,607 A | 7/1997 | Bolieau |
| 5,660,414 A | 8/1997 | Karlow et al. |
| 5,685,930 A | 11/1997 | Gallagher et al. |
| 5,709,358 A | 1/1998 | Kubota |
| 5,718,449 A | 2/1998 | Numazawa et al. |
| 5,755,457 A | 5/1998 | Specht |
| 5,785,349 A | 7/1998 | Storey et al. |
| 5,785,350 A | 7/1998 | Inoue |
| 5,791,683 A * | 8/1998 | Shibata et al. ........... 280/730.2 |
| 5,833,263 A | 11/1998 | Wittmann et al. |
| 5,876,060 A * | 3/1999 | Davidson et al. ........ 280/728.2 |
| 5,884,937 A * | 3/1999 | Yamada .................. 280/730.2 |
| 5,899,491 A * | 5/1999 | Tschaeschke ............ 280/730.1 |
| 5,904,002 A * | 5/1999 | Emerling et al. |
| 5,904,367 A * | 5/1999 | Warnez et al. ............... 280/732 |
| 5,921,576 A * | 7/1999 | Sinnhuber ................ 280/728.2 |
| 5,951,039 A * | 9/1999 | Severinski et al. ...... 280/728.2 |
| 6,073,961 A * | 6/2000 | Bailey et al. ............ 280/730.2 |
| 6,079,732 A * | 6/2000 | Nakajima et al. ........ 280/728.1 |
| 6,079,735 A * | 6/2000 | Fallmann et al. ........ 280/730.2 |
| 6,082,761 A * | 7/2000 | Kato et al. ............... 280/730.2 |
| 6,119,406 A | 9/2000 | Gulisano et al. |

* cited by examiner

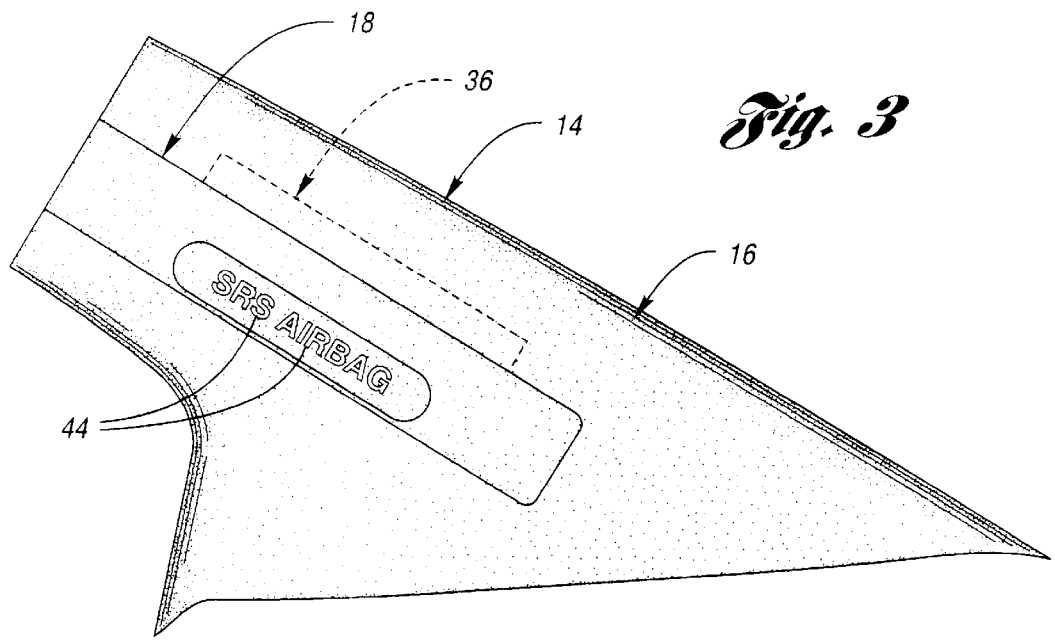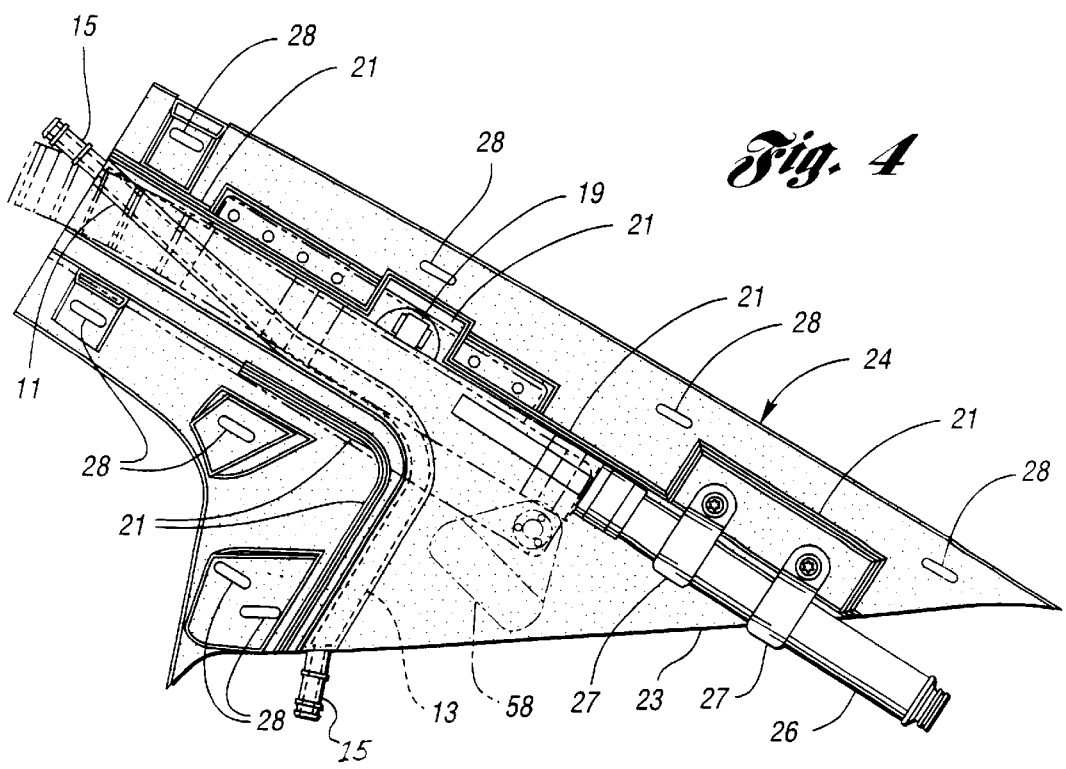

MOTOR VEHICLE TRIM ASSEMBLY INCLUDING A HOLLOW PLASTIC PANEL FOR A SIDE IMPACT INFLATABLE AIR BAG SYSTEM

CROSS-REFERENCE TO RELATED APPLICATIONS

This application is related to co-pending U.S. patent application entitled "Motor Vehicle Instrument Panel Having Integrally Hinged Air Bag Door" filed Jul. 9, 1998 and having U.S. Ser. No. 09/112,965. This application is also related to U.S. patent application entitled "Door Trim Panel Assembly and Plastic Inner Panel For Use Therein" filed Dec. 16, 1998 and having U.S. Ser. No. 09/213,072. This application is further related to U.S. patent application Ser. No. 09/114,393, filed Jul. 13, 1998, entitled "Hollow Plastic Article Formed By A Gas-Assisted Injection Molding System".

TECHNICAL FIELD

This invention relates to motor vehicle trim assemblies including plastic panels and, in particular, to motor vehicle trim assemblies including plastic panels for side impact inflatable air bag systems.

BACKGROUND ART

Side impact inflatable air bag systems are designed to help protect heads and torsos in car accidents including roll over accidents. In such accidents, occupants' heads may strike pillars, side rails, headers and upper interior components. Such systems typically include "inflatable curtains" which often deploy from the roof of the vehicle and protect front and rear seat occupants along the car's side windows.

If such air bag curtains are to deploy through such vehicle trim components, such components must not only match other interior components but also allow the inflating air bag curtain to perform its safety function while ensuring that parts of the components do not break off during air bag curtain deployment.

Not only initial but also replacement costs for the system can be reduced, quality can be improved and styling can be enhanced by molding a trim assembly of the system in a minimum number of pieces which can be easily incorporated within the limited space provided within the vehicle. It is desirable to make a trim cover of the assembly from a relatively hard and strong plastic yet the entire assembly should also meet head impact criteria.

The following U.S. patents relate to side impact air bag deployment systems: U.S. Pat. Nos. 5,273,309; 5,308,112; 5,322,322; 5,333,898; 5,333,899; 5,362,097; 5,398,958; 5,462,308; 5,464,246; 5,480,181; 5,540,459; 5,566,977; 5,588,672; 5,605,346; 5,636,862; 5,647,607; 5,660,414; 5,718,449; 5,755,457; 5,785,349; and 5,785,350.

U.S. Pat. No. 5,685,930 discloses a molded instrument panel having an integral air bag deployment door for a passenger side air bag. The door is hingedly connected to a vehicle structure to pivot within an opening in the panel. Also, a flexible tethering hinge retains a broken door portion to the vehicle structure.

U.S. Pat. No. 5,639,116 discloses an instrument panel with an integral air bag opening on the driver's side.

U.S. Pat. Nos. 5,564,515; 5,556,153; and 5,468,039 disclose molded instrument panels for motor vehicles per se.

U.S. Pat. No. 5,709,358; 5,549,324; 5,458,361; 5,447,328; and 5,445,410 disclose instrument panels having integral air bag openings.

As described in U.S. Pat. Nos. 4,474,717, 5,225,141, 5,069,858, 5,098,637, and 5,447,762, it is known in the plastic molding art to use pressurized fluid in conjunction with the plastic molding of articles. The pressurized fluid is typically nitrogen gas which is introduced into the mold cavity at or near the completion of the plastic injection. The pressurized fluid serves several purposes. First, it allows the article so formed to have hollow interior portions which correspond to weight and material savings. Second, the pressurized fluid within the mold cavity applies outward pressure to force the plastic against the mold surfaces while the article solidifies. Third, the cycle time is reduced as the gas migrates through the most fluent inner volume of the plastic and replaces the plastic in these areas which would otherwise require an extended cooling cycle. Fourth, the gas pressure pushes the plastic against the mold surfaces, thereby obtaining the maximum coolant effect from the mold.

Gas-assisted injection molding has been used to produce a wide variety of automotive parts as shown in European Patent Specification 472,788 and as shown in the above-noted application entitled "Hollow Plastic Article Formed By A Gas-Assisted Injection Molding System."

DISCLOSURE OF INVENTION

An object of the present invention is to provide a motor vehicle trim assembly including an improved plastic inner trim panel for a side impact inflatable air bag system having an uninflated air bag curtain. The assembly also includes a plastic door, a door hinge including a plastic member to ensure that the door does not separate from the rest of the assembly during air bag deployment, and a latch for holding the door in its closed position but yet allows deployment of the air bag curtain through an opening formed in an outer trim panel of the assembly.

Another object of the present invention is to provide a motor vehicle trim assembly including an improved plastic inner trim panel for a side impact inflatable air bag system wherein the assembly includes a door hinged to the inner trim panel of the assembly to ensure that the door does not separate from the assembly during air bag deployment and a latch for holding the door in its closed position within an opening formed in a plastic outer trim panel. In this way, the door need not be integrally formed with the relatively hard and strong plastic outer trim panel, thereby reducing not only initial but also replacement costs; also quality is improved, and styling is enhanced.

A further object of the present invention is to provide a hollow plastic panel of a one-piece construction and adapted to be mounted in a motor vehicle wherein a gas channel defined by a conduit portion of the panel may conduct fluids or pass solid objects such as electrical wires through the panel.

In carrying out the above objects and other objects of the present invention, a motor vehicle trim panel assembly for a side impact inflatable air bag system is provided. The assembly includes an outer trim panel having inner and outer surfaces and an opening extending completely therethrough. The assembly also includes a plastic door adapted to enclose an uninflated air bag curtain of the system and close the opening in a closed position of the door. The door also has inner and outer surfaces. The assembly further includes an inner trim panel adapted to be mounted in a motor vehicle and which is connected to the outer trim panel. The inner trim panel also has inner and outer surfaces. The inner surfaces of the door and the inner trim panel define a storage compartment for the uninflated air bag curtain. The assembly includes a latch for holding the door in its closed position and which allows deployment of the air bag curtain. Finally, the assembly includes a hinge including a plastic member extending between the inner trim panel and the door for hingedly connecting the door to the inner trim panel and to allow the door to swing open and to ensure that the door does not separate from the inner trim panel during air bag curtain deployment within the motor vehicle.

Preferably, the plastic member is integrally formed with the plastic door.

Also, preferably, the latch includes at least one holding portion integrally formed with either the door or the inner trim panel for holding the door in its closed position. The door preferably includes a plurality of spaced movable flaps. Each of the flaps has a cavity formed therein. The latch includes a plurality of spaced holding portions which enter corresponding cavities of the flaps to hold the door in its closed position.

Preferably, the assembly further includes a lock to prevent removal of the holding portions from their corresponding cavities thereby locking the door in its closed position. However, the lock allows deployment of the air bag curtain.

The lock preferably includes a flange integrally formed with the container and in abutting engagement with the movable flaps to lock the door in its closed position.

The outer surface of the outer trim panel preferably lies in substantially the same plane as the outer surface of the door.

Also, preferably, the inner trim panel includes a channel for receiving and retaining an inflator of the system therein.

The outer trim panel and the door at least partially define an automotive pillar such as a "C" pillar.

The inner trim panel is preferably a plastic panel of a one-piece construction and the outer trim panel is an injection molded part separate from the plastic door. Preferably, the door and the hinge comprise a single injection molded part and the inner plastic panel, the latch and the lock comprise a single injection molded part.

Further in carrying out the above objects and other objects of the present invention, in a motor vehicle trim assembly for a side impact inflatable air bag system, an inner trim panel is provided. The assembly includes an outer trim panel and a plastic door adapted to enclose an uninflated air bag curtain of the system. The inner trim panel is adapted to be mounted in a motor vehicle and is also adapted to be connected to the outer trim panel. The inner trim panel has a relatively thin base wall portion having top, bottom, inner and outer surfaces. The inner surface of the base wall portion partially defines a storage compartment for the uninflated air bag curtain. The inner trim panel also has a relatively thick conduit portion integrally formed with the base wall portion. The conduit portion has an aperture for fluidly communicating the top surface to the bottom surface of the base wall portion.

Preferably, the base wall portion of the inner trim panel includes a channel for receiving and retaining an inflator of the system therein.

Also, preferably, the conduit portion of the inner trim panel is formed by a pressurized fluid.

Still further in carrying out the above objects and other objects of the present invention, a hollow plastic panel of a one-piece construction adapted to be mounted in a motor vehicle is provided. The panel is formed from a molten plastic resin by a gas-assisted injection molding system including a mold having an article-defining cavity and an injection aperture wherein molten plastic resin is injected through the injection aperture and wherein pressurized fluid is communicated to the molten plastic resin in the article-defining cavity to at least partially distribute the molten plastic resin. The panel includes a hollow conduit portion including walls formed by the pressurized fluid to define a gas channel which extends completely through the panel between end surfaces thereof. The panel also includes a solid base wall portion connected to the conduit portion. The gas channel defined by the resin walls is provided for conducting fluids or passing solid objects such as electric wires through the panel.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 3 is a front elevational view of an outer trim panel of the assembly constructed in accordance with the present invention with the door closed and a hinge of the assembly indicated by phantom lines;

FIG. 4 is a view similar to the view of FIG. 3 with the outer trim panel and the door removed to show an inner trim panel of the assembly having a self-draining feature in the form of a gas channel extending completely through the trim panel; a seat belt anchor is indicated by phantom lines;

BEST MODE FOR CARRYING OUT THE INVENTION

Figure 1:
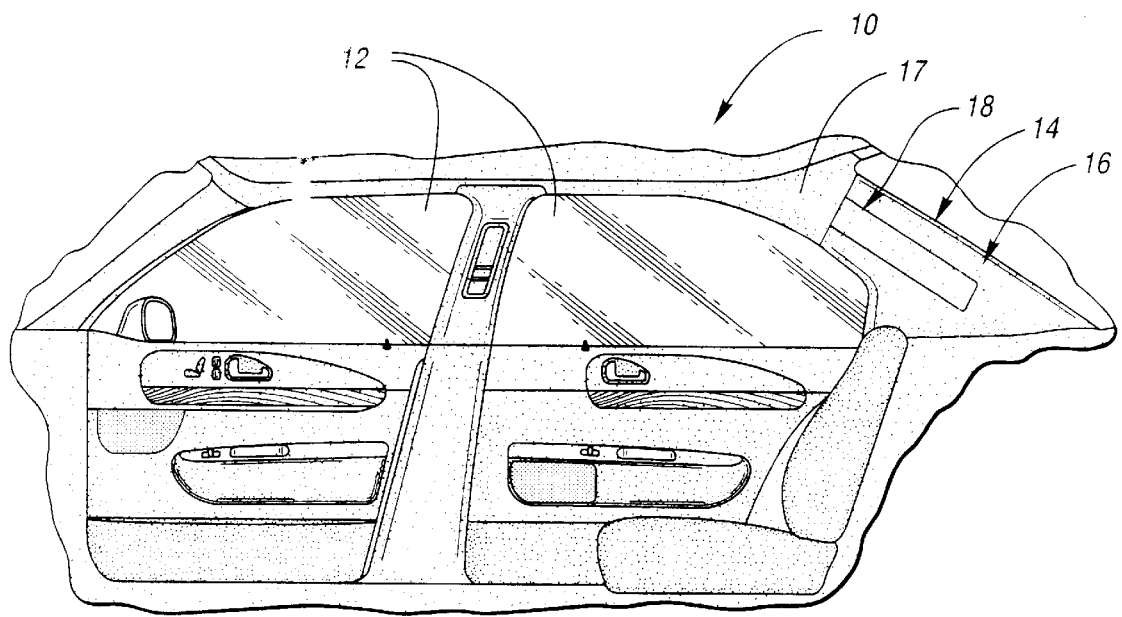
FIG. 1 is a schematic view, partially broken away, of a motor vehicle interior wherein an uninflated air bag curtain is hidden from view behind a closed door of a plastic trim assembly constructed in accordance with the present invention.
Figure 2:
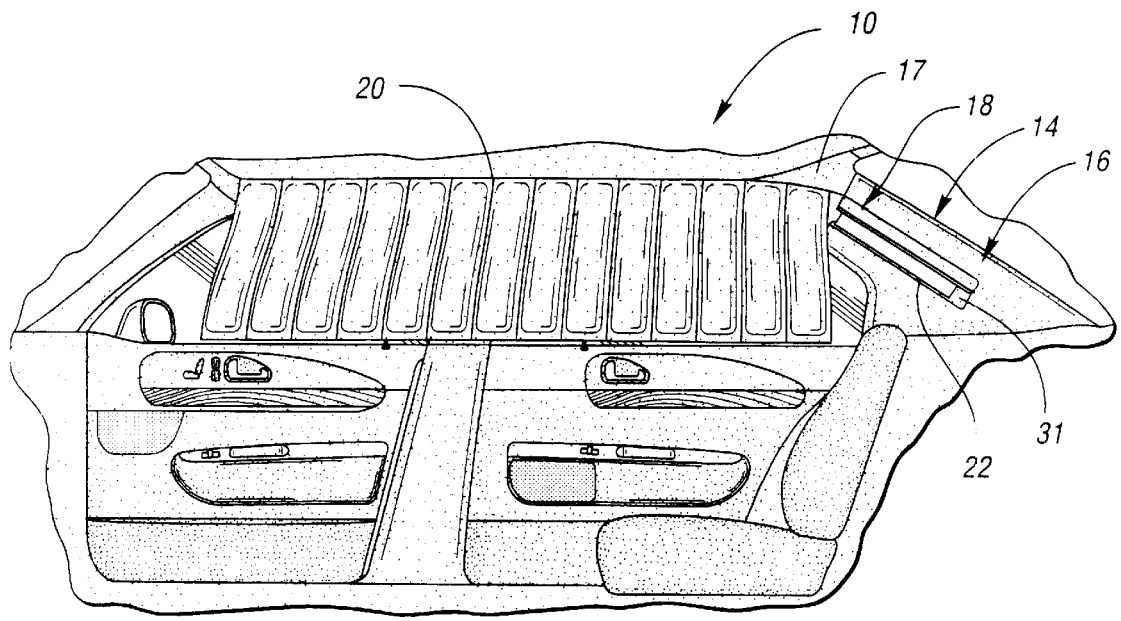
FIG. 2 is a view similar to FIG. 1 wherein the door of the assembly is open and an inflated air bag curtain is deployed over windows of the vehicle.

Referring now to the drawing Figures, there is illustrated in FIGS. 1 and 2 schematic perspective views of various structures, generally indicated at 10., as seen from the interior of a motor vehicle, including car side windows 12. A trim assembly, generally indicated at 14, constructed in accordance with the present invention includes a plastic outer trim panel, generally indicated at 16, the top surface of which is flush with the top surface of a trim panel 17. The trim panel 17 is mounted in the motor vehicle so it is not in the way of an inflating air bag curtain 20.

The assembly 14 also includes a plastic door, generally indicated at 18, in its closed and open positions in FIGS. 1 and 2, respectively.

The inflated air bag curtain 20 covers the windows 12 in FIG. 2 in the open position of the door 18 to perform its safety function.

A container 22 for the air bag curtain 20 is also shown in FIG. 2. As illustrated in phantom in FIG. 4, the container 22 of the curtain 20 is held within a suitably formed plastic inner trim panel, generally indicated at 24, by a connector 19.

As best shown in FIGS. 1 and 2, the trim assembly 14 forms a "C"pillar of the vehicle. However, it is to be understood that the assembly 14 may also be employed to form "A" or "B" pillars or other side trim panels or components.

Referring again to FIG. 4, the assembly 14 is shown without the door 18 or the outer trim panel 16 to expose the plastic inner trim panel 24 for storing the uninflated air bag curtain 20 within its container 22. The inner trim panel 24 includes a base wall portion 23 with upper and lower wall portions 21 integrally formed therewith.

The trim panel 24 also includes a relatively thick hollow conduit portion 11 which extends from a top surface to a bottom surface of the inner trim panel 24 and has a channel 13 extending completely therethrough to permit a fluid, such as water, to flow completely through the conduit portion 11. A pair of plastic nipples 15 are preferably integrally formed at opposite ends of the conduit portion 11 in fluid communication with the channel 13. The nipples 15 are adapted to receive and retain drain tubes (not shown) by having a roughened outer surface so that water entering an upper drain tube can flow therethrough, through the upper nipple 15, through the channel 13, through the lower nipple 15 and then through a lower drain tube.

Alternatively, the channel 13 may be used to pass solid objects such as electrical wire(s) through the inner trim panel 24.

The conduit portion 11 also strengthens the base wall portion 23 to prevent fragmentation of the base wall portion 23 during air bag deployment.

The plastic inner trim panel 24 also houses an inflator 26 of the side impact inflatable air bag system. The inflator 26 is positioned adjacent the uninflated air bag curtain 20 to inflate the curtain 20 in a well known fashion. The inflator 26 is secured within a channel 25 (FIGS. 6 and 7) formed in the base wall portion 23 by clamping assemblies 27. An inner surface 33 of the door 18 and an inner surface 29 of the inner trim panel 24 define a storage compartment 31 for the uninflated air bag curtain 20.

Figure 6:
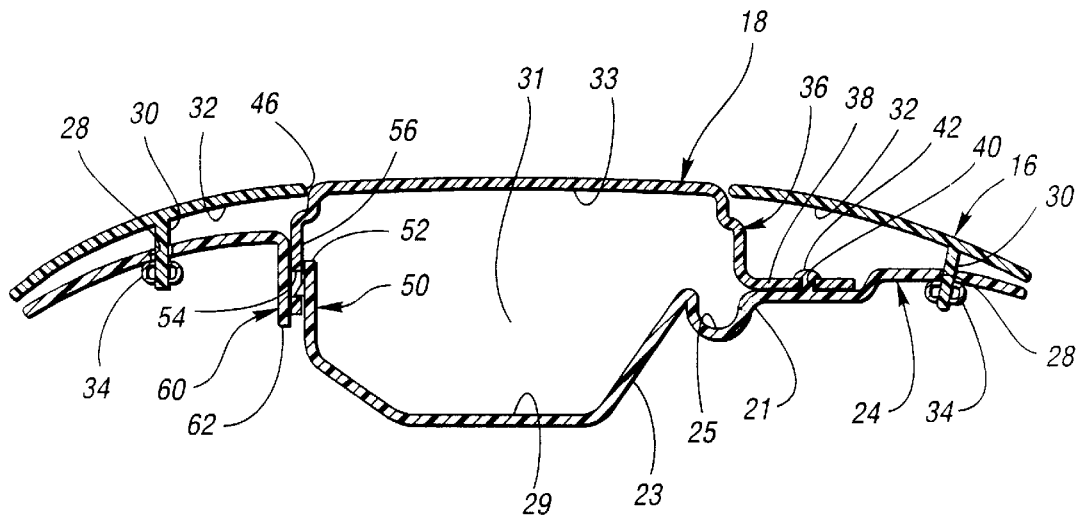
FIG. 6 is a view, partially broken away and in cross-section, of the assembly with the door locked in its closed position.
Figure 7:
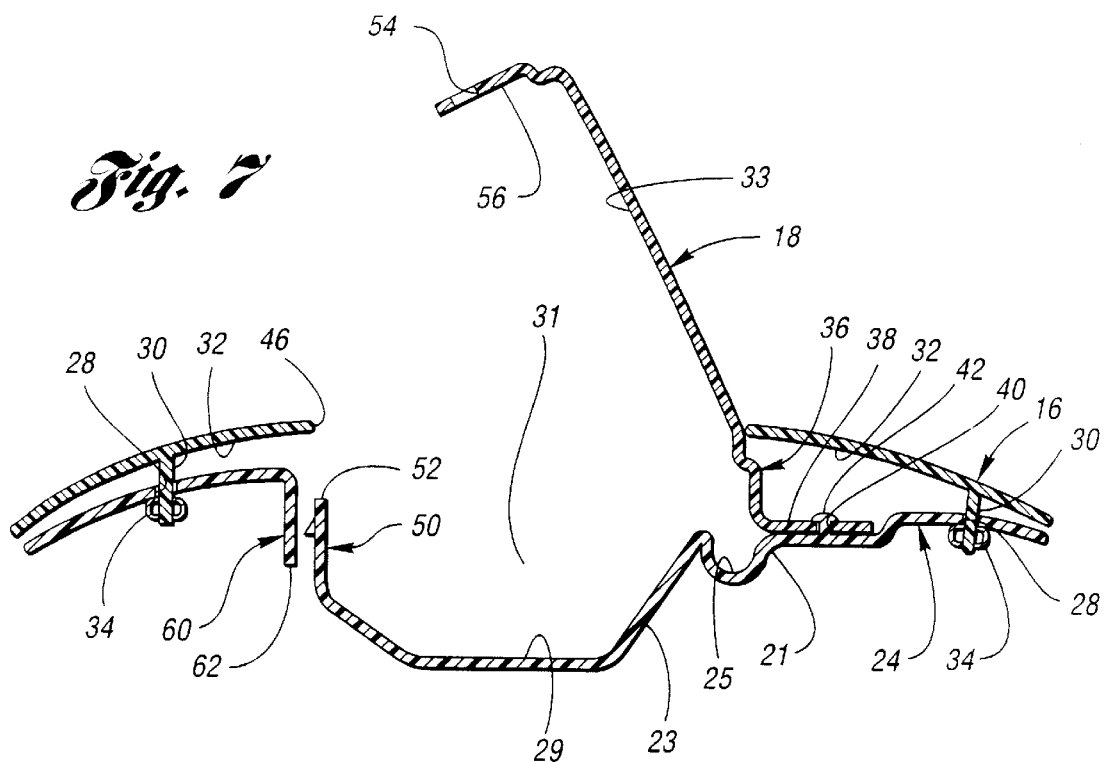
FIG. 7 is a view similar to the view of FIG. 6 with the door open.

The inner trim panel 24 includes slots 28 to receive posts 30 which extend downwardly from and are integrally connected at an inner surface 32 of the outer trim panel 16 as best shown in FIGS. 6 and 7. The posts 30 extend through the slots 28 and receive fasteners 34 at their end portions to secure the outer trim panel 16 to the inner trim panel 24.

Figure 5:
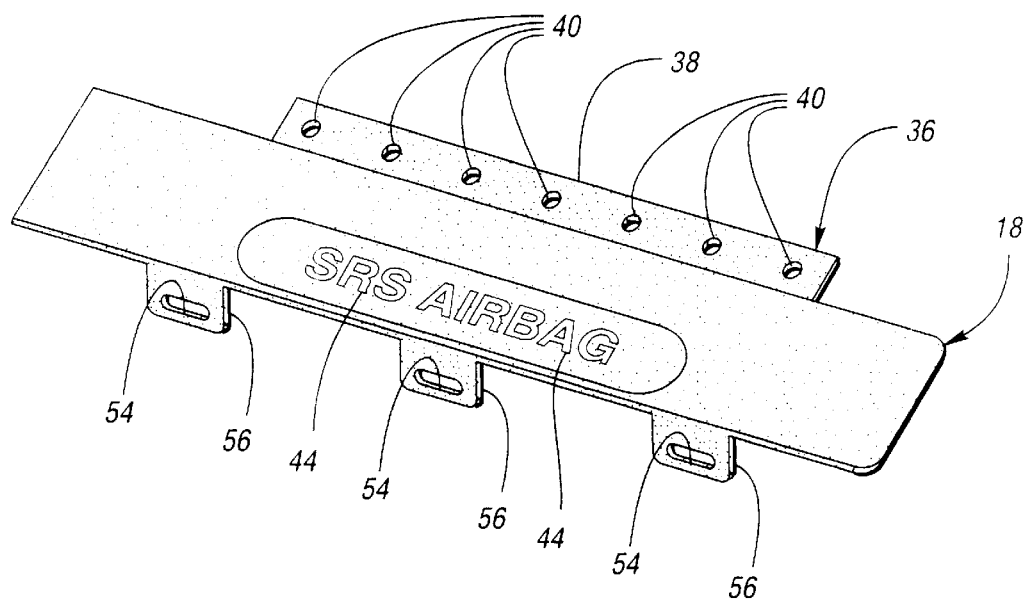
FIG. 5 is a schematic perspective view of the door, an integrally formed hinge and integrally formed spaced movable flaps.

As further indicated in FIGS. 6 and 7, as well as FIG. 5, the door 18 is hingedly connected to the inner trim panel 24 by a hinge, generally indicated at 36. The hinge 36 includes a plastic member 38 having holes 40 formed therethrough to secure the hinge 36 to the inner trim panel 24 such as by heat staking the two together at towers 42 integrally formed with the inner trim panel 24 and which extend through the holes 40. The hinge 36 allows the door 18, which is integrally formed therewith out of plastic, to swing open and ensures that the door 18 does not separate from the inner trim panel 24 during air bag curtain deployment.

The outer surface of the door 18 is co-planar or flush with the outer surface of the outer trim panel 16 in its closed position as indicated in FIG. 6. As shown in FIGS. 3 and 5, indicia 44 are provided on the outer surface of the door 18 to indicate that an uninflated air bag curtain lies beneath the door 18. The door 18 closes an opening 46 formed in the outer trim panel 16 in the door's closed position, as best shown in FIGS. 6 and 7.

The trim assembly 14 also includes a latch, generally indicated at 50 in FIGS. 6 and 7, for holding the door 18 in its closed position but which still allows deployment of the air bag curtain 20. The latch 50 includes a plurality of spaced holding portions 52 (only one of which is shown in FIGS. 6 and 7) integrally formed with the base wall portion 23 of the plastic inner trim panel 24. The holding portions 52 enter cavities 54 formed in flaps 56 integrally formed with the door 18, as best shown in FIG. 5, to hold the door 18 in its closed position as best shown in FIG. 6. Obviously, alternatively, the holding portions 52 could be integrally formed with the door 18 and the flaps 56 with their cavities 54 could be integrally formed with the base wall portion 23 of the inner trim panel 24.

The base wall portion 23 of the inner trim panel 24 is also adapted to receive and retain a seat belt anchor, indicated in phantom at 58 in FIG. 4. The anchor 58 is provided for a rear seat belt assembly (not shown).

The trim assembly 14 also includes a lock, generally indicated at 60 in FIGS. 6 and 7, to prevent removal of the holding portions 50 from their corresponding cavities 54 to thereby lock the door 18 in its closed position as shown in FIG. 6. However, the lock 60 allows deployment of the air bag curtain 20 through the opening 46 in the outer trim panel 16. The lock 60 comprises a flange 62 integrally formed with the plastic inner trim panel 24. The flange 62 abuttingly engages the movable flaps 56 to lock the door 18 in its closed position as best shown in FIG. 6.

Figure 8:
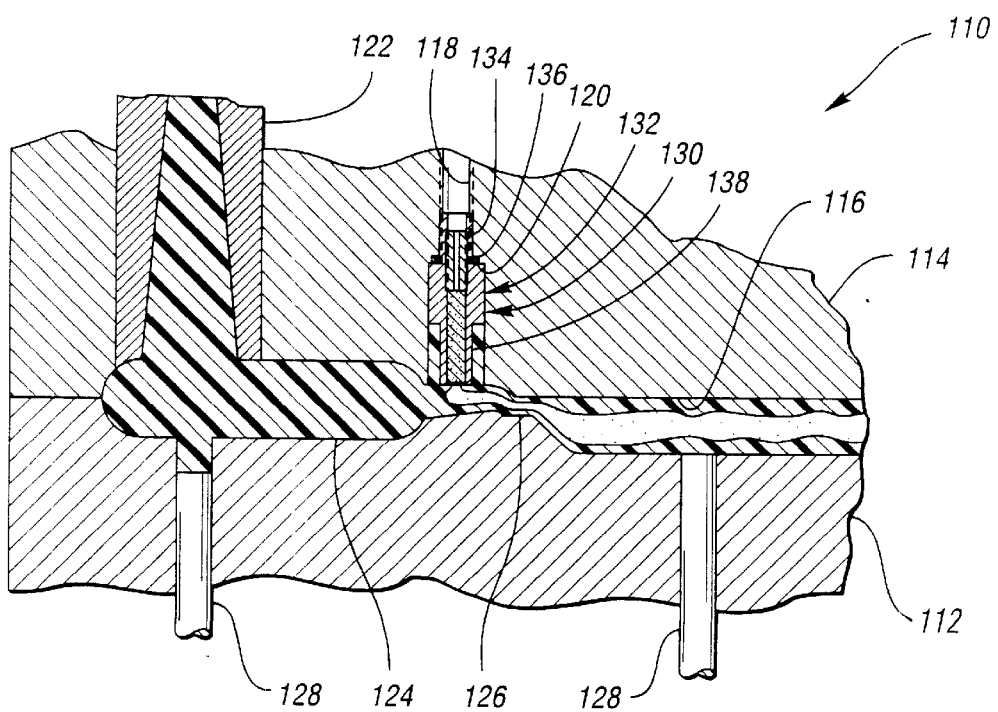
FIG. 8 is a view, partially broken away and in cross-section, of a mold showing a typical gas path through a shot of thermoplastic resin for making the inner trim panel of the invention.

Referring now to FIG. 8, there is illustrated a mold, generally indicated at 110, for use in a gas-assisted injection molding system to form the inner trim panel 24 with its hollow conduit portion 21. The mold 110 includes a first mold half 112 and a second mold half 114. The first and second mold halves 112 and 114, respectively, are movable relative to each other between an open position and a closed position as shown in FIG. 8, wherein the first and second mold halves 112 and 114, respectively, define an article-defining cavity 116.

The second mold half 114 includes a gas passageway 118 which extends from an exterior surface (not shown) of the second mold half 114 to an inner interior surface 120 of the second mold half 114 in fluid communication with the article-defining cavity 116.

The second or stationary mold half 114 includes a sprue 122 for communicating thermoplastic material to a runner 124 which, in turn, communicates with the article-defining cavity 116 via a gate 126. A thermoplastic flow path is defined by the sprue 122, the runner 124 and the gate 126. Article ejector pins 128 can extend through the first or movable mold half 112 to eject a completed part.

The mold 110 also includes a gas pin assembly, generally indicated at 130. The gas pin assembly 30 includes a one-piece housing, generally indicated at 132. A base portion 134 of the housing 132 is threadedly secured to the second mold half 114 at the interior surface 120 of the second mold half 114 so that the gas pin assembly 130 can be readily removed from the second mold half 114 in the open position of the mold 110. A rubber O-ring 136 is provided about the base portion 134 to seal the housing 132 within the second mold half 114.

The housing 132 also includes a hexagonal head portion 138 so that the assembly 130 can be readily removed from the second mold half 114 in the open position of the mold 110 by a conventional tool (not shown).

The hollow conduit portion 11 as well as the hollow nipples 15 are formed by the pressurized fluid wherein gas is introduced at one end of the upper nipple 15, flows through the upper nipple 15 to hollow it out, flows through the conduit portion 11 to hollow it out and to form the channel 13 and then flows through the lower nipple 15 to hollow it out. Then flexible tubes may be pushed over their respective nipples 15 at opposite ends of the trim panel 24.

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. A motor vehicle trim assembly for a side impact inflatable air bag system having a side impact air bag curtain that extends along a roof line of the vehicle to cover at least one side window of the vehicle, the assembly comprising:
    an outer trim panel having inner and outer surfaces and an opening extending completely therethrough;
    a plastic door adapted to enclose the air bag curtain when uninflated and close the opening in a closed position of the door, the door having inner and outer surfaces and wherein the outer trim panel and the door at least partially defines an automotive pillar;
    a plastic inner trim panel adapted to be mounted in a motor vehicle and which is connected to the outer trim panel, the inner trim panel also having inner and outer surfaces, the inner surfaces of the door and the inner trim panel defining a storage compartment for at least a portion of the uninflated air bag curtain;
    a latch for holding the door in its closed position and which allows deployment of the air bag curtain;
    a hinge including a plastic member extending between the inner trim panel and the door for hingedly connecting the door to the inner trim panel and to allow the door to swing open and to ensure that the door does not separate from the inner trim panel during air bag curtain deployment within the motor vehicle; and
    an inflator housed by the inner trim panel of the pillar for inflating the air bag curtain to deploy from the roof line and the storage compartment in the pillar.

2. The assembly as claimed in claim 1 wherein the plastic member is integrally formed with the plastic door.

3. The assembly as claimed in claim 1 wherein the latch includes at least one holding portion integrally formed with either the door or the inner trim panel for holding the door in its closed position.

4. The assembly as claimed in claim 3 wherein the door includes a plurality of spaced movable flaps, each of the flaps having a cavity formed therein and wherein the latch includes a plurality of spaced holding portions which enter corresponding cavities of the flaps to hold the door in its closed position.

5. The assembly as claimed in claim 4 further comprising a lock to prevent removal of the holding portions from their corresponding cavities thereby locking the door in its closed position and wherein the lock allows deployment of the air bag curtain.

6. The assembly as claimed in claim 5 wherein the lock includes a flange integrally formed with the inner trim panel and in abutting engagement with the movable flaps to lock the door in its closed position.

7. The assembly as claimed in claim 1 wherein the outer surface of the outer trim panel lies in substantially the same plane as the outer surface of the door.

8. The assembly as claimed in claim 1 wherein the inner trim panel includes a channel for receiving and retaining an inflator of the system therein.

9. The assembly as claimed in claim 1 wherein the pillar is a "C" pillar.

10. The assembly as claimed in claim 1 wherein the inner trim panel is a plastic panel of a one-piece construction.

11. The assembly as claimed in claim 1 wherein the outer trim panel is an injection molded part separate from the plastic door.

12. The assembly as claimed in claim 1 wherein the door and the hinge comprise a single injection molded part.

13. The assembly as claimed in claim 1 further comprising a lock for locking the door in its closed position wherein the lock allows deployment of the air bag curtain.

14. The assembly as claimed in claim 13 wherein the inner trim panel, the latch and the lock comprise a single injection molded part.

15. The assembly as claimed in claim 1 wherein the outer trim panel is a thermoplastic olefin outer trim panel.

16. The assembly as claimed in claim 1 including an uninflated air bag curtain and wherein the inner trim panel is hollow for storing the uninflated air bag curtain.

17. In a motor vehicle trim assembly for a side impact inflatable air bag system, the assembly including an outer trim panel and a plastic door adapted to enclose an uninflated air bag curtain of the system, an inner trim panel adapted to be mounted in a motor vehicle and also adapted to be connected to the outer trim panel, the inner trim panel comprising:
    a base wall portion having top, bottom, inner and outer surfaces, the inner surface of the base wall portion partially defining a storage compartment for the uninflated air bag curtain; and
    a conduit portion integrally formed within the base wall portion and having an aperture for fluidly communicating the top surface to the bottom surface of the base wall portion.

18. The inner trim panel as claimed in claim 17 wherein the base wall portion includes a channel for receiving and retaining an inflator of the system therein.

19. The inner trim panel as claimed in claim 18 wherein the conduit portion is formed by a pressurized fluid.

20. A hollow plastic inner trim panel of a one-piece construction for storing an uninflated air bag curtain that is adapted to be mounted in a motor vehicle and being formed from a molten plastic resin by a gas-assisted injection molding system including a mold having an article-defining cavity and an injection aperture wherein molten plastic resin is injected through the injection aperture and wherein pressurized fluid is communicated to the molten plastic resin in the panel cavity to at least partially distribute the molten plastic resin, the panel comprising:
    a gas-assisted, injection molded, hollow conduit portion including walls formed by the pressurized fluid to define a gas channel which extends completely through the inner trim panel between end surfaces thereof, wherein the inner trim panel at least partially defines an automotive pillar from which the air bag is projected;
    a gas-assisted, injection molded, solid base wall portion connected to the conduit portion, the gas channel defined by the resin walls being provided for conducting fluids or passing solid objects through the inner trim panel; and
    at least one hollow nipple portion including walls also formed by the pressurized fluid, the at least one nipple portion being connected to the hollow conduit portion and adapted to receive and retain a drain tube thereover to fluidly communicate the drain tube to the gas channel.

21. The panel as claimed in claim 20 further comprising a pair of hollow nipple portions-connected at opposite ends of the hollow conduit portion.

22. A motor vehicle trim assembly for a side impact inflatable air bag system adapted for installation in an interior of an automotive vehicle having an automotive pillar and a roof line, the assembly comprising:

an outer trim panel adapted to be within the interior of the automotive vehicle and having an opening therein;

a plastic door that closes the opening, wherein the door and the outer trim panel at least partially define a portion of the automotive pillar;

a plastic inner trim panel connected to the outer trim panel having a storage compartment in the portion defining the automotive pillar and relating to the opening in the outer trim panel;

an uninflated side impact air bag curtain at least partially stored within the storage compartment in the pillar and deployed from the storage compartment and the roof line to cover windows within the interior of the vehicle;

a latch for securing the door with respect to the outer trim panel when the door closes the opening and releasable when the air bag curtain projects from its concealment;

a hinge connecting the door to the inner trim panel so that the door pivots about the hinge when the latch releases and the air bag curtain projects from the storage compartment in the pillar and the roof line; and an inflator stored within the inner trim panel of the pillar for inflating the air bag curtain to deploy from the storage compartment in the pillar and the roof line.

* * * * *